United States Patent
Fallon

(10) Patent No.: US 11,417,245 B2
(45) Date of Patent: Aug. 16, 2022

(54) FRAME ASSEMBLY FOR USE WITH ONE OR MORE ELECTRONIC DISPLAYS

(71) Applicant: Green Light Innovations, Lake Saint Louis, MO (US)

(72) Inventor: Timothy G. Fallon, Austin, TX (US)

(73) Assignee: Green Light Innovations, Lake Saint Louis, MO (US)

( * ) Notice: Subject to any disclaimer, the term of this patent is extended or adjusted under 35 U.S.C. 154(b) by 241 days.

(21) Appl. No.: 16/642,933

(22) PCT Filed: Aug. 21, 2018

(86) PCT No.: PCT/US2018/047300
§ 371 (c)(1),
(2) Date: Feb. 28, 2020

(87) PCT Pub. No.: WO2019/046045
PCT Pub. Date: Mar. 7, 2019

(65) Prior Publication Data
US 2020/0349870 A1    Nov. 5, 2020

Related U.S. Application Data

(60) Provisional application No. 62/552,102, filed on Aug. 30, 2017.

(51) Int. Cl.
*G09F 9/30* (2006.01)
*G09F 9/302* (2006.01)
(Continued)

(52) U.S. Cl.
CPC .......... *G09F 9/3023* (2013.01); *F16M 11/08* (2013.01); *G06F 1/1607* (2013.01); *G06F 1/181* (2013.01)

(58) Field of Classification Search
CPC . G09F 9/3023; G09F 15/0037; A47G 1/0622; A47G 1/065; A47G 1/162
See application file for complete search history.

(56) References Cited

U.S. PATENT DOCUMENTS 2,790,258 A * 4/1957 Freshour ............. G09F 15/0068
                                                                40/610
3,132,432 A * 5/1964 Yee .......................... A47G 1/142
                                                                40/730
(Continued)

FOREIGN PATENT DOCUMENTS

KR           100569696 B1    4/2006

*Primary Examiner* — Gary C Hoge
(74) *Attorney, Agent, or Firm* — Stinson LLP

(57) ABSTRACT

A frame assembly presents one or more electronic displays. The frame assembly includes a first panel having a first front surface and a first rear surface. The first panel is oriented such that the first front surface faces a first direction and the first rear surface faces a second direction opposite the first direction. A plurality of inner members are coupled to the first front surface and extend from the first front surface towards the first direction. A plurality of outer members are coupled to the first front surface and extend from the first front surface towards the first direction. The outer members are spaced from the inner members to define a plurality of channels therebetween. A second panel is hingedly coupled to the first panel such that the first panel and/or the second panel are rotatable about an axis of rotation.

19 Claims, 10 Drawing Sheets

(51) Int. Cl.
*F16M 11/08* (2006.01)
*G06F 1/16* (2006.01)
*G06F 1/18* (2006.01)

(56) References Cited

U.S. PATENT DOCUMENTS

| | | | | |
|---|---|---|---|---|
| 3,318,032 | A * | 5/1967 | Robison | A47G 1/0622 |
| | | | | 40/714 |
| 3,529,374 | A * | 9/1970 | Spertus | A47G 1/065 |
| | | | | 40/730 |
| 4,226,037 | A * | 10/1980 | Rodriguez | A47G 1/065 |
| | | | | 248/486 |
| 5,016,374 | A | 5/1991 | Engstrom | |
| 5,546,687 | A * | 8/1996 | Iorfida | A47G 1/0622 |
| | | | | 362/128 |
| 6,153,311 | A * | 11/2000 | Springer | A47G 1/0616 |
| | | | | 428/15 |
| 6,230,428 | B1 * | 5/2001 | Albin | A47G 1/065 |
| | | | | 40/605 |
| 6,775,939 | B1 * | 8/2004 | Juern | A47G 1/065 |
| | | | | 248/489 |
| 7,373,746 | B1 * | 5/2008 | Pettesch | G09F 7/18 |
| | | | | 160/135 |
| 8,104,204 | B1 | 1/2012 | Syrstad | |
| 9,351,593 | B1 * | 5/2016 | Little | A47G 1/065 |
| 11,043,149 | B1 * | 6/2021 | Archuletta | G09F 15/0087 |
| 2002/0092959 | A1 * | 7/2002 | Szarata | A47G 1/1653 |
| | | | | 248/489 |
| 2003/0193005 | A1 * | 10/2003 | Hui | A47F 5/0006 |
| | | | | 248/489 |
| 2005/0076552 | A1 * | 4/2005 | Tolna | G09F 15/0056 |
| | | | | 40/607.03 |
| 2006/0191179 | A1 | 8/2006 | Gonzalez et al. | |
| 2008/0276420 | A1 * | 11/2008 | Johnson | G09F 15/0068 |
| | | | | 16/231 |
| 2009/0019752 | A1 * | 1/2009 | Liao | G09F 13/04 |
| | | | | 40/714 |
| 2010/0043264 | A1 | 2/2010 | Johnson, Jr. | |
| 2011/0232146 | A1 * | 9/2011 | Lin | G09F 1/12 |
| | | | | 40/714 |
| 2012/0102797 | A1 | 5/2012 | Heo | |
| 2012/0119924 | A1 | 5/2012 | Beukema et al. | |
| 2013/0081313 | A1 * | 4/2013 | Hornbeek | A47G 1/065 |
| | | | | 40/721 |
| 2013/0255116 | A1 * | 10/2013 | Kaoh | G09F 9/33 |
| | | | | 40/563 |
| 2016/0293067 | A1 | 10/2016 | Castigli et al. | |
| 2017/0164764 | A1 * | 6/2017 | Kacius | A47G 1/06 |

\* cited by examiner

FRAME ASSEMBLY FOR USE WITH ONE OR MORE ELECTRONIC DISPLAYS

CROSS-REFERENCE TO RELATED APPLICATIONS

This application is the National Stage of International Application No. PCT/US2018/047300, filed Aug. 21, 2018, which claims the benefit of U.S. Provisional Application No. 62/552,102 filed Aug. 30, 2017, each of which is hereby incorporated by reference in their respective entireties.

BACKGROUND

Illuminated signs are frequently used to advertise or convey a message to customers. Known signs are generally fixed in one position and, thus, are limited to displaying messages to passersby in one direction. To increase exposure, some known signs display messages in multiple directions. However, at least some known signs displaying messages in multiple directions are cumbersome and/or costly to procure and maintain.

SUMMARY

In one aspect, a frame assembly is provided to present one or more electronic displays. The frame assembly includes a first panel having a first front surface and a first rear surface. The first panel is oriented such that the first front surface faces a first direction and the first rear surface faces a second direction opposite the first direction. A plurality of inner members are coupled to the first front surface and extend from the first front surface towards the first direction. A plurality of outer members are coupled to the first front surface and extend from the first front surface towards the first direction. The outer members are spaced from the inner members to define a plurality of channels therebetween. A second panel is hingedly coupled to the first panel such that the first panel and/or the second panel are rotatable about an axis of rotation. The second panel has a second front surface and a second rear surface.

In another aspect, a method is provided for assembling a frame assembly. The method includes coupling a plurality of inner members to a front surface of a first panel such that the inner members extend from the front surface towards a first direction, coupling a plurality of outer members to the front surface such that the outer members extend from the front surface towards the first direction, and hingedly coupling a second panel to the first panel such that the first panel and/or the second panel are rotatable about an axis of rotation. The front surface faces the first direction. The outer members are spaced from the inner members to define a plurality of channels therebetween.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

Features, aspects, and advantages of the present disclosure will become better understood when the following Detailed Description is read with reference to the accompanying drawings in which like reference characters represent like elements throughout, wherein.

Figure 1:
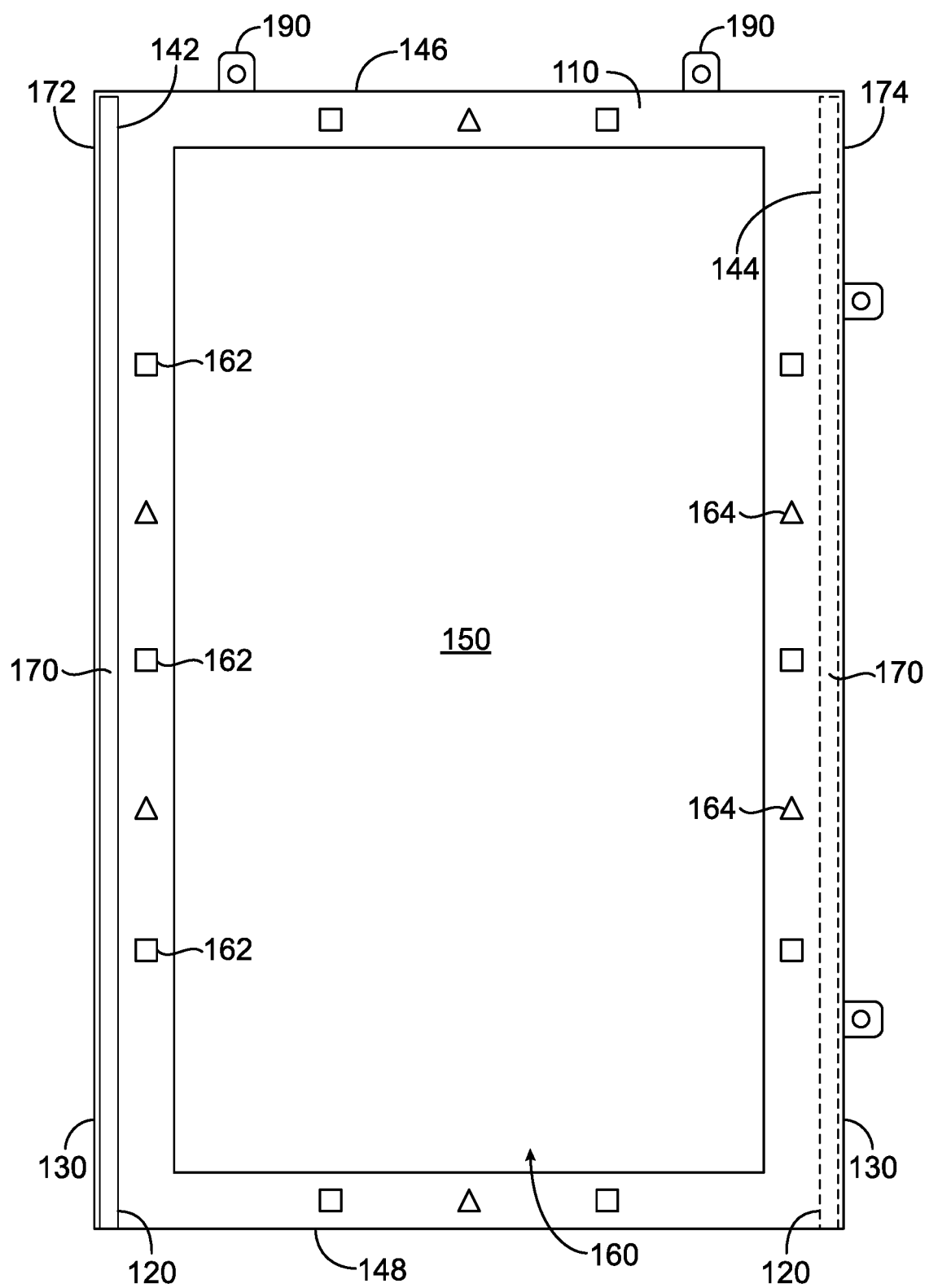
FIG. 1 is a schematic front view of a vertical slice of an example frame subassembly.

Although specific features of various examples may be shown in some drawings and not in others, this is for convenience only. Any feature of any drawing may be referenced and/or claimed in combination with any feature of any other drawing.

DETAILED DESCRIPTION

The present disclosure relates to structural assemblies and, more particularly, to a frame assembly for use with one or more electronic displays. The frame assembly may be used, for example, to provide structural support to the electronic displays. Examples described herein include a first panel, inner members extending from a front surface of the first panel, and outer members extending from the front surface of the first panel. The outer members are spaced from the inner members to define channels therebetween. The channels may be sized to receive masts that enable the first panel to be held in an upright position. In this manner, an electronic display coupled to the first panel may also be held in the upright position. Additionally, a second panel may be hingedly coupled to the first panel. In this manner, an electronic display coupled to the second panel may be moved relative to another electronic display coupled to the first panel.

In one aspect, a system is provided for use with one or more electronic displays. The system includes a plurality of rear panels positionable behind the electronic displays. The rear panels include a first rear panel and a second rear panel hingedly coupled to the first rear panel such that the first rear panel and/or the second rear panel are rotatable about an axis of rotation. A plurality of moldings are positionable in front of the electronic displays. The moldings include a plurality of translucent areas. One or more translucent areas are configured to extend about the one or more electronic displays when the moldings are in front of the electronic displays. A plurality of light sources are configured to emit at least some light. The light sources are positionable between the rear panels and the moldings to emit the at least some light through the translucent areas. A plurality of inner members extend between a first rear panel and a first molding, and a plurality of outer members extend from the first rear panel in a first direction. The outer members are spaced from the inner members to define a plurality of channels therebetween. In some examples, the system includes a base, a plurality of masts extending from the base, and a cover extending over the base. The masts are positionable in the channels between the inner members and the outer members. The cover may include a plurality of openings defined therethrough, and a plurality of receivers defining a plurality of ports that are configured to receive the masts therein. In this manner, the masts may extend upward from the base and through the openings defined through the cover. Moreover, the system may include a content management system configured to identify content presented by the electronic displays, and control the light sources such that the at least some light emitted through the translucent areas complements the identified content.

In another aspect, a method is provided for providing a frame assembly. The method includes extending a plurality of inner members from a front surface of a first panel towards a first direction, and extending a plurality of outer members from the front surface of the first panel towards the first direction such that a plurality of channels are defined between the outer members and the inner members. The outer members are spaced from the inner members such that the channels are sized to receive a plurality of masts therein. A second panel is hingedly coupled to the first panel such that the first panel and/or the second panel are rotatable about an axis of rotation.

Certain terminology will be used in the following description for convenience and reference only and not in a limiting sense. For example, the terms "upper," "lower," "vertical," "horizontal," "left," "right," "front," "rear," and the like designate directions in relation to the perspective shown in the drawings. The terms "in," "out," and the like designate directions toward and away from, respectively, a geometric center of the frame assembly described herein.

Figure 2:
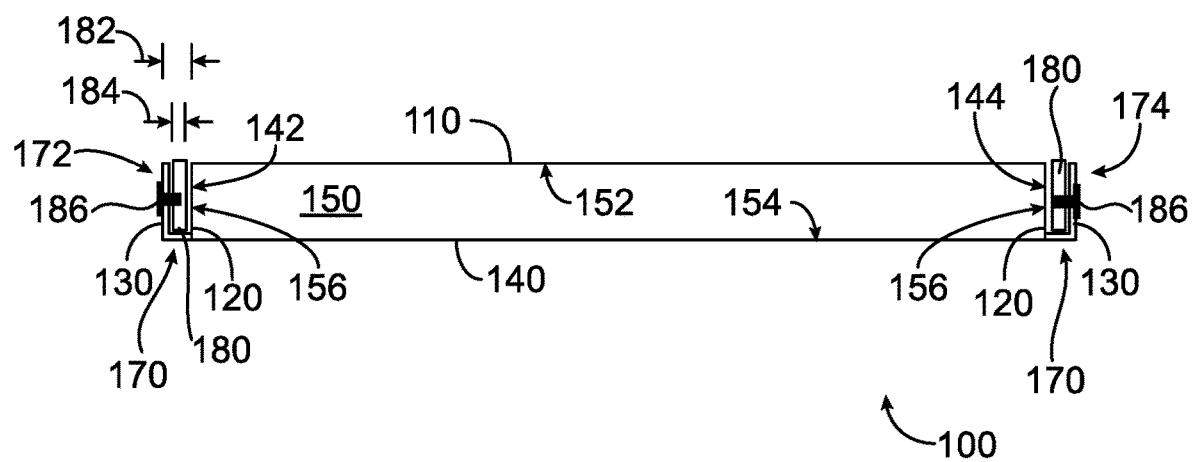
FIG. 2 is a schematic top view of a horizontal slice of the frame subassembly shown in FIG. 1.

FIGS. 1 and 2 show an example frame subassembly 100. FIG. 1 is a schematic front view of a vertical slice of the frame subassembly 100; and FIG. 2 is a schematic top view of a horizontal slice of the frame subassembly 100.

The frame subassembly 100 includes a rear panel 110, a plurality of inner members 120 extending from the rear panel 110, and a pair of outer members 130 extending from the rear panel 110. In some examples, the inner members 120 extend between the rear panel 110 and a front panel 140 (shown in FIG. 2). Inner members 120 may include, for example, a left member 142 (shown in FIG. 1), a right member 144 (shown in FIG. 1), an upper member 146, and a lower member 148.

The rear panel 110, inner members 120 (e.g., left member 142, right member 144, upper member 146, lower member 148), and/or front panel 140 may be arranged and/or assembled to define a cavity 150. The cavity 150 may be defined by a front surface 152 (shown in FIG. 2) of the rear panel 110, a rear surface 154 (shown in FIG. 2) of the front panel 140, and/or inner surfaces 156 (shown in FIG. 2) of the inner members 120 (e.g., a right surface of the left member 142, a left surface of the right member 144, a lower surface of the upper member 146, an upper surface of the lower member 148). The cavity 150 may have any shape, size, and/or configuration that enables the frame subassembly 100 to function as described herein.

An electronic display 160 (shown in FIG. 1) is positionable in the cavity 150 and orientable to present information or content to one or more observers or passersby. In some examples, the frame subassembly 100 includes one or more light sources 162 (shown in FIG. 1) and/or light sensors 164 (shown in FIG. 1) positioned at one or more locations about the electronic display 160. In this manner, the light sources 162 are configured to emit at least some light along a periphery of the electronic display 160. The light sensors 164 are configured to detect an ambient light, a light emitted from the light sources 162, and/or a light emitted from the electronic display 160.

The outer members 130 are spaced from inner members 120 corresponding to the outer member 130 to define a pair of channels 170 therebetween. For example, a left outer member 172 may be spaced from the left member 142 to define a left channel 170, and/or a right outer member 174 may be spaced from the right member 144 to define a right channel 170. Each channel 170 is sized, shaped, and/or configured to receive a respective mast 180 (shown in FIG. 2) of a stand (shown in FIGS. 6 and 7) therein. For example, a width 182 (shown in FIG. 2) of each channel 170 may be wider than a width 184 (shown in FIG. 2) of each mast 180. In some examples, the width 184 of a mast 180 is approximately 0.125 in. (0.3175 cm). The outer members 130 may be parallel with the inner members 120 such that the width 182 of each channel 170 is constant throughout. In some examples, the outer members 130 may extend from a front surface 152 of the rear panel 110 in a cantilevered fashion. The outer members 130 may be free from or not directly coupled to the inner members 120 and/or front panel 140, for example. In some examples, the channels 170 are oriented to face the same direction as the electronic display 160 (e.g., a frontward direction) or a direction opposite that of the electronic display 160 (e.g., a rearward direction). Alternatively, the channels 170 and/or masts 180 may have any size, shape, and/or configuration that enables the frame subassembly 100 to function as described herein.

To facilitate securing the masts 180 in the channels 170, a plurality of coupling mechanisms 186 (shown in FIG. 2) couple the masts 180 to the inner members 120 and/or outer members 130. In some examples, the coupling mechanisms 186 extend laterally across the channels 170 between the inner members 120 and outer members 130. The coupling mechanisms 186 may be extended, for example, through one or more openings defined in the outer members 130 and/or one or more openings defined in the masts 180. In some examples, a coupling mechanism 186 is or includes a set screw. Alternatively, the coupling mechanism 186 may be any element or component that enables a mast 180 to be secured between an inner member 120 and outer member 130.

In some examples, the frame subassembly 100 includes one or more mounting mechanisms 190 (shown in FIG. 1) that enable the frame subassembly 100 to be mounted to a wall (not shown). The frame subassembly 100 may be mounted, for example, in a portrait orientation (e.g., in the orientation shown in FIG. 1) or in a landscape orientation (e.g., in an orientation 90° clockwise or counterclockwise relative to the orientation shown in FIG. 1). The mounting mechanisms 190 may be spaced approximately 8.0, 16.0, or 24.0 in. (20.32, 40.64, or 60.96 cm, respectively) apart from each other for alignment with standardly-spaced vertical wall studs. In some examples, the mounting mechanisms 190 extend outward from a slot defined in an outer periphery of the frame subassembly 100 and are selectively translatable or moveable within the slot to adjust a space between adjacent mounting mechanisms 190.

The mounting mechanisms 190 may have one or more openings defined therethrough that are sized to receive a screw, a nail, a bracket, a hook, a rod, and the like for coupling the frame subassembly 100 to vertical wall studs.

In some examples, a mounting mechanism 190 is or includes a hang tab extending outward from the rear panel 110, inner members 120, and/or outer members 130. Alternatively, the mounting mechanism 190 may be any element or component and/or be in any position and/or orientation that enable the frame subassembly 100 to be hung or suspended.

Figure 3:
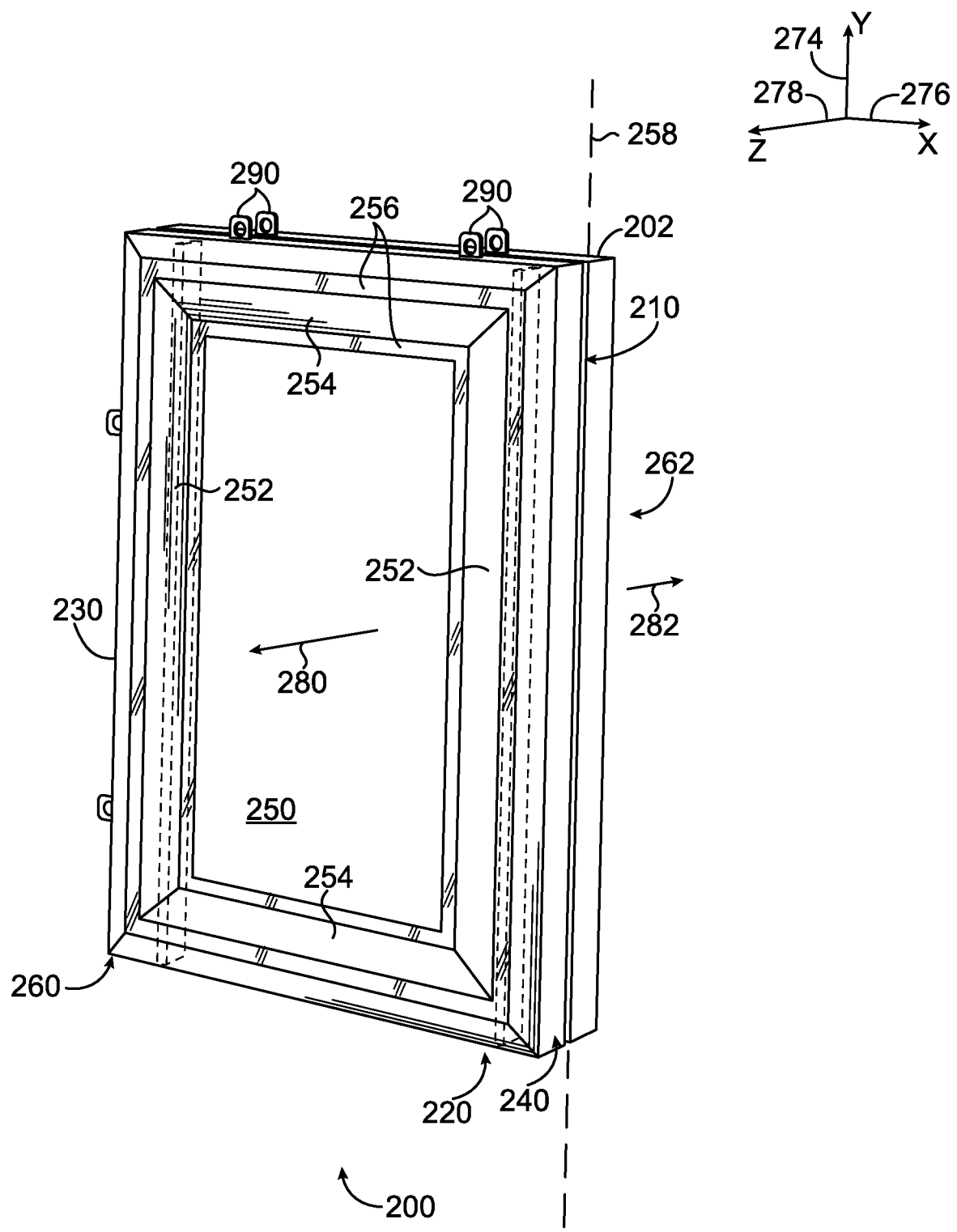
FIG. 3 is a front perspective view of an example frame assembly including a frame subassembly, such as the frame subassembly shown in FIG. 1, in a closed configuration.
Figure 4:
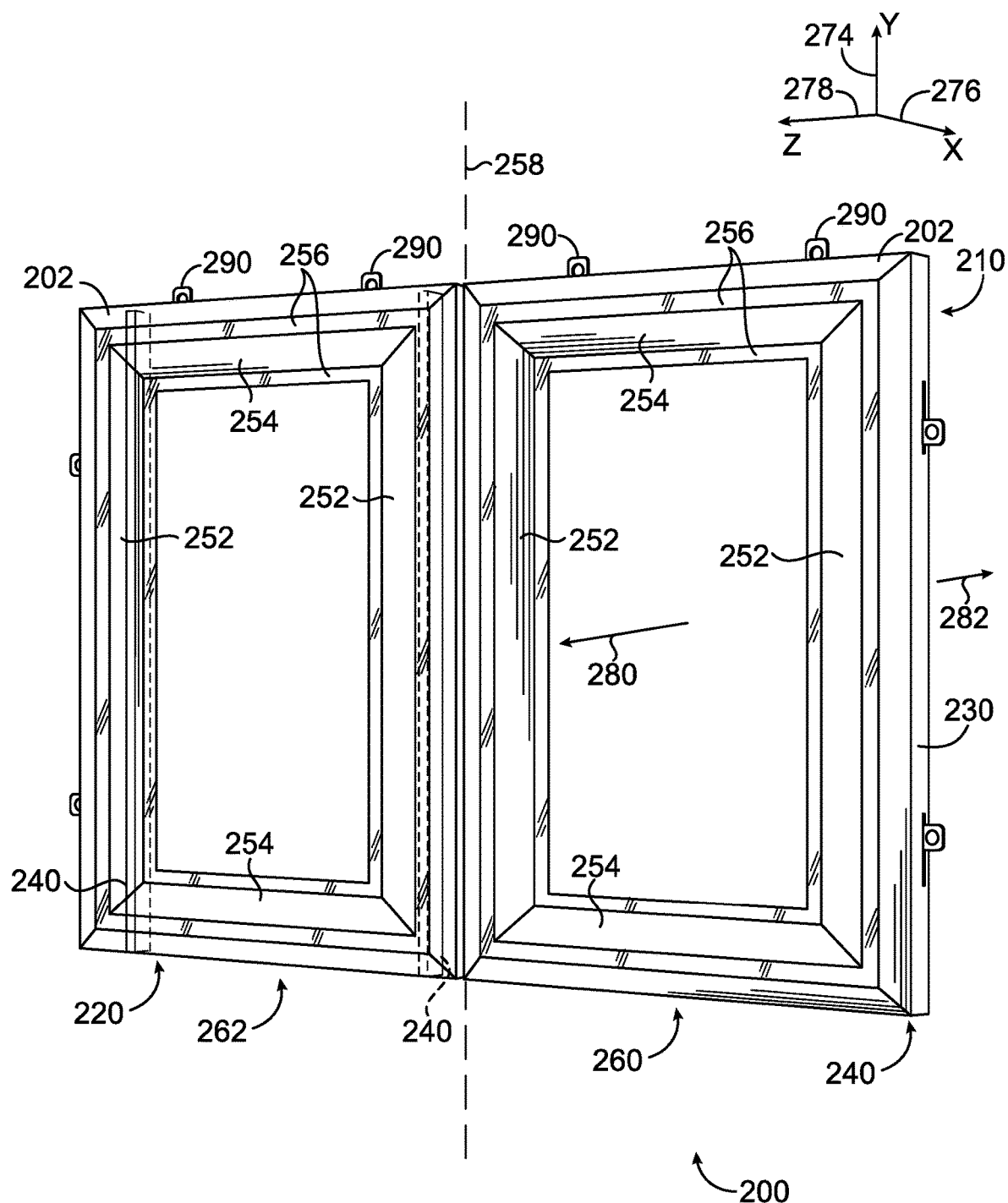
FIG. 4 is a front perspective view of the frame assembly shown in FIG. 3 in an open configuration.
Figure 5:
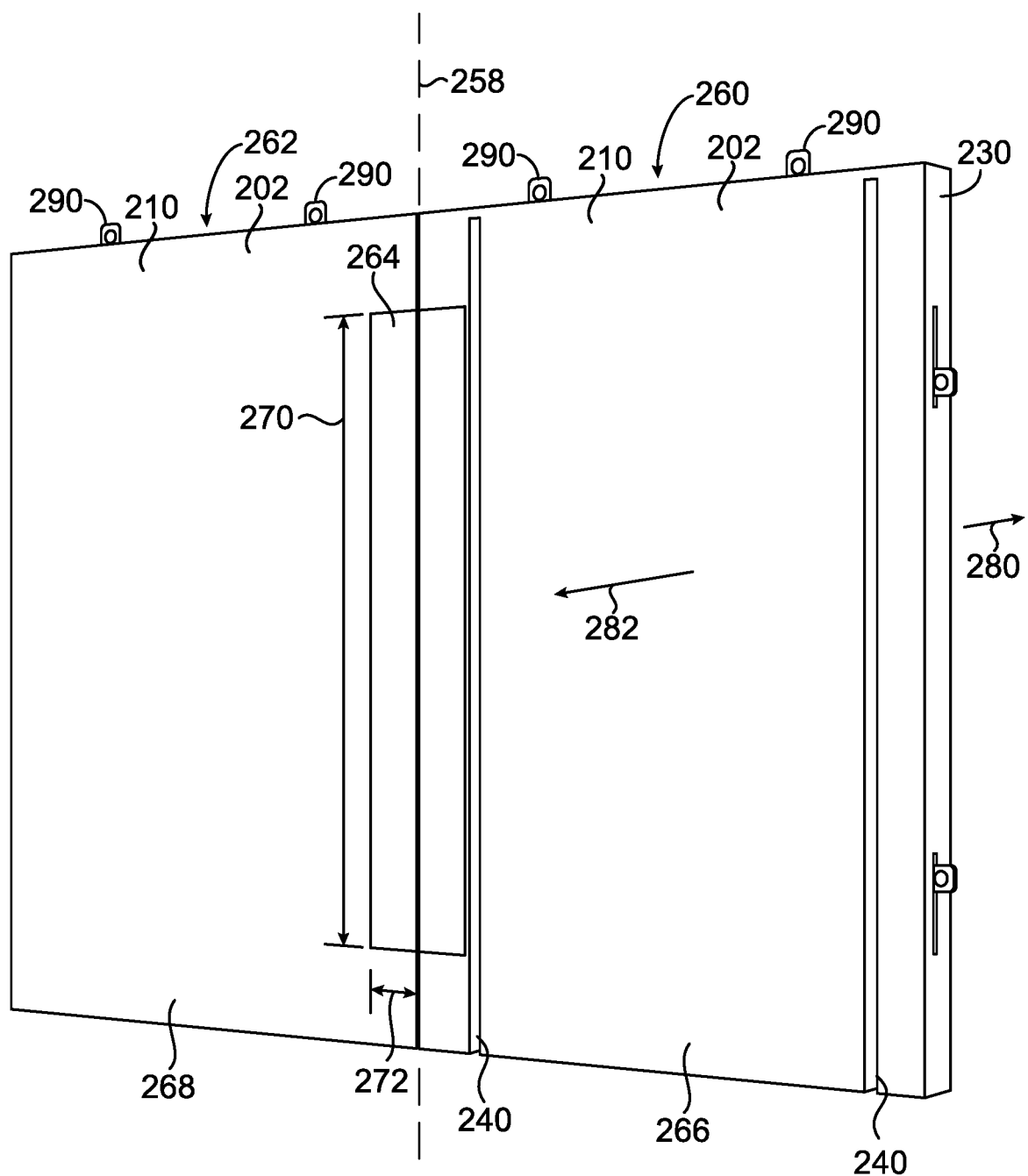
FIG. 5 is a rear perspective view of the frame assembly shown in FIG. 3 in the open configuration.

FIGS. 3-5 show an example frame assembly 200 that may include one or more frame subassemblies (e.g., frame subassembly 100). FIG. 3 is a front perspective view of the frame assembly 200 in a closed configuration; FIG. 4 is a front perspective view of the frame assembly 200 in an open configuration; and FIG. 5 shows a rear perspective view of the frame assembly 200 in the open configuration.

The frame assembly 200 includes a plurality of housing compartments 202 (e.g., frame subassembly 100). Each housing compartment 202 includes a rear panel 210 (e.g., rear panel 110), a molding 220 (e.g., front panel 140) (shown in FIGS. 3 and 4) extending generally parallel with the rear panel 210, and a plurality of sidewalls 230 (e.g., inner members 120, outer members 130) extending generally between the rear panel 210 and the molding 220. In some examples, the sidewalls 230 are coupled to a front surface of the rear panel 210 (e.g., front surface 152) and extend substantially perpendicularly therefrom.

The rear panel 210, molding 220, and sidewalls 230 may be arranged and/or assembled to define a cavity (e.g., cavity 150). The cavity may be defined by the front surface of the rear panel 210, a rear surface of the molding 220, and/or inner surfaces of a plurality of the sidewalls 230 (e.g., inner surface 156). Inner surfaces may include, for example, a right surface of a left sidewall (e.g., left member 142), a left surface of a right sidewall (e.g., right member 144), a lower surface of an upper sidewall (e.g., upper member 146), and/or an upper surface of a lower sidewall (e.g., lower member 148). In some examples, the sidewalls 230 are arranged and/or assembled in an orthogonal (e.g., rectangular) configuration generally circumscribing or extending along a perimeter of the rear panel 210 and/or molding 220. Alternatively, the cavity may have any shape, size, and/or configuration that enables the housing compartment 202 to function as described herein.

Figure 6:
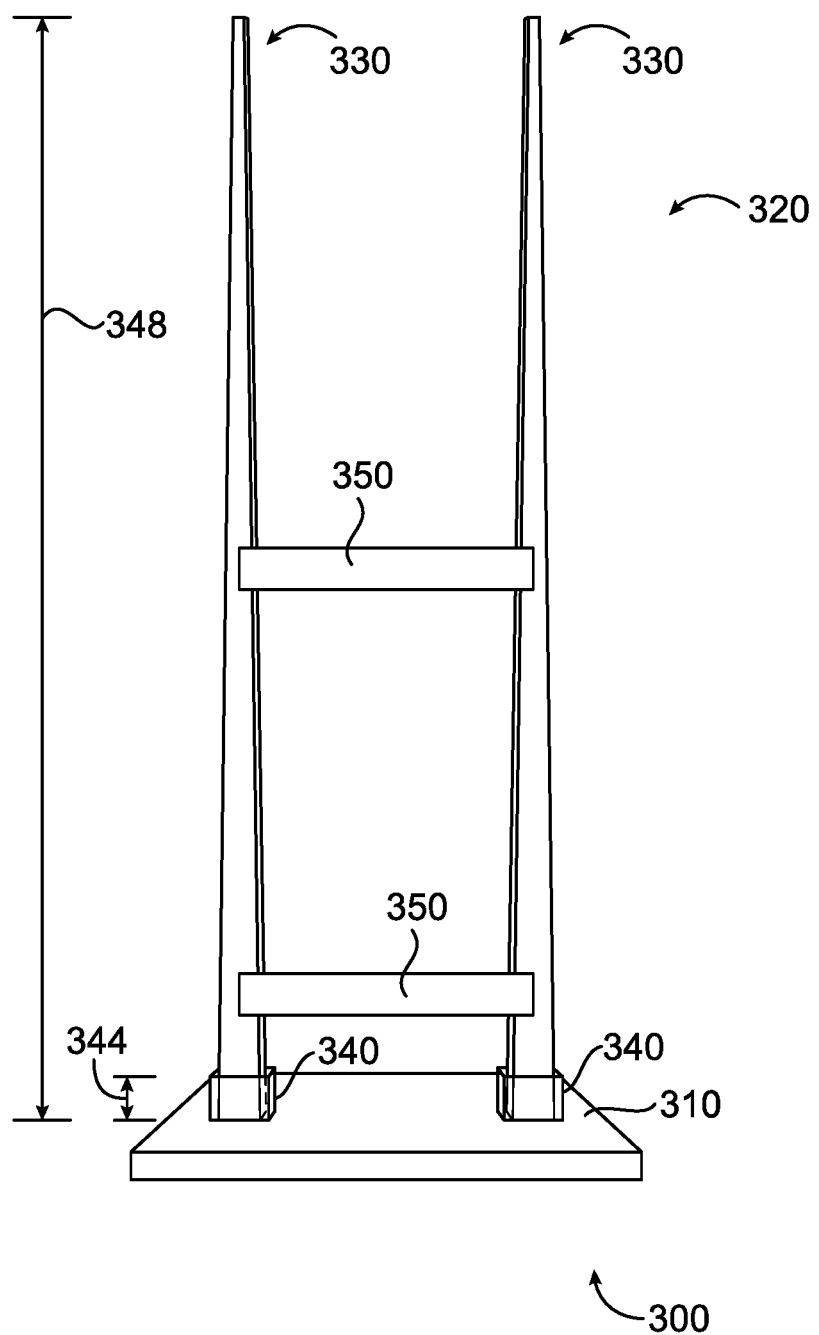
FIG. 6 is a front view of an example stand that may be used with the frame assembly shown in FIG. 3.
Figure 7:
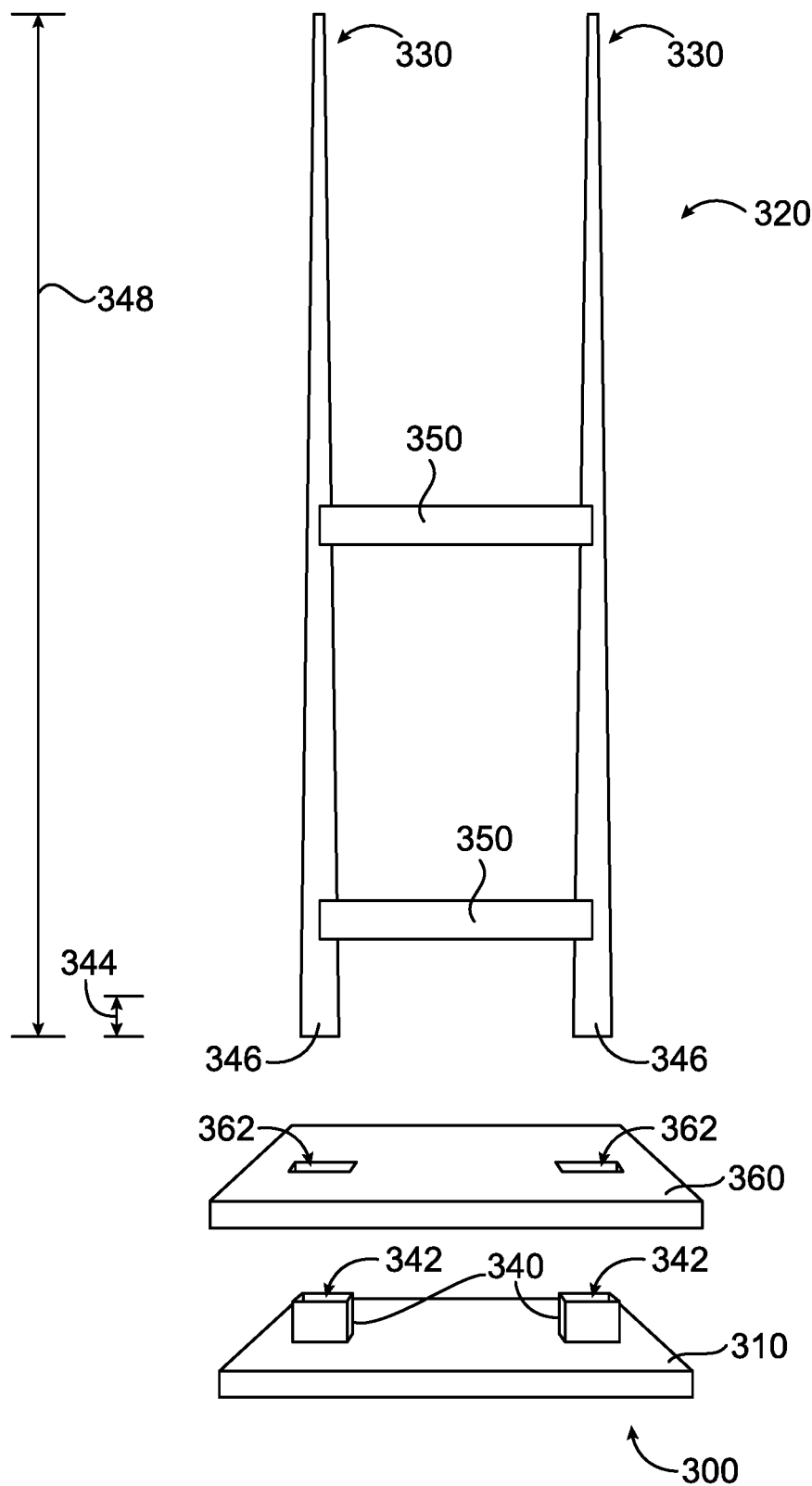
FIG. 7 is an exploded view of the stand shown in FIG. 6.

The sidewalls 230 of one or more housing compartments 202 are arranged and/or assembled to define a plurality of channels 240 (e.g., channel 170) for mounting the frame assembly 200 to a stand (shown in FIGS. 6 and 7). A channel 240 may be defined, for example, by a segment of the front surface of the rear panel 210 extending between an inner sidewall and a corresponding outer sidewall, a segment of the rear surface of the molding 220 extending between the inner sidewall and the corresponding outer sidewall, an outer surface of the inner sidewall (e.g., left member 142, right member 144), an inner surface of the outer sidewall (left outer member 172, right outer member 174), a segment of the lower surface of the upper sidewall extending between the inner sidewall and the corresponding outer sidewall (e.g., upper member 146), and/or the upper surface of the lower sidewall extending between the inner sidewall and the corresponding outer sidewall. Alternatively, the sidewalls 230 may be in any position and/or orientation that enable the housing compartment 202 to function as described herein.

An electronic display 250 (e.g., electronic display 160) is positioned in the cavity and oriented to present information or content to one or more observers or passersby. In some examples, the molding 220 includes a plurality of vertical portions 252 (shown in FIGS. 3 and 4) and a plurality of horizontal portions 254 (shown in FIGS. 3 and 4) arranged and/or assembled in an orthogonal (e.g., rectangular) configuration generally circumscribing or extending along a perimeter of the electronic display 250. For example, the vertical portions 252 may be coupled to and/or aligned with a left sidewall and a right sidewall, and the horizontal portions 254 may be coupled to and/or aligned with an upper sidewall and a lower sidewall. Alternatively, the molding 220 may have any shape, size, and/or configuration that enables the housing compartment 202 to function as described herein.

In some examples, the housing compartment 202 includes one or more light sources 162 (shown in FIGS. 1 and 9) and/or light sensors 164 (shown in FIGS. 1 and 9) positioned between the rear panel 210 and the molding 220. In some examples, the light sources 162 and/or light sensors 164 are generally aligned with one or more vertical portions 252 and/or horizontal portions 254. The light sources 162 may be positioned, for example, to emit at least some light along a periphery of the electronic display 250. In some examples, the vertical portions 252 and/or horizontal portions 254 include a plurality of translucent areas 256 (shown in FIGS. 3 and 4) that allow at least some light to pass therethrough. The translucent areas 256 may extend, for example, longitudinally along the vertical portions 252 and/or horizontal portions 254. In this manner, the light sources 162 may emit at least some light about the electronic display 250 through the translucent areas 256. The light sensors 164 may be positioned to detect an ambient light, a light emitted from the light sources 162, and/or a light emitted from the electronic display 250.

In some examples, the translucent areas 256 form a first rectangle extending about the electronic display 250 at an inner section (e.g., adjacent to an outer section of the electronic display 250) of the vertical portions 252 and horizontal portions 254 and a second rectangle extending about the electronic display 250 at a middle section (e.g., between the inner section and an opposing outer section) of the vertical portions 252 and horizontal portions 254. The first and second rectangles may be concentric and spaced from each other (e.g., an area of the vertical portions 252 and/or horizontal portions 254 other than the translucent areas 256 extends between the first and second rectangles). For example, each leg of the second rectangle may be parallel to a corresponding leg of the first rectangle.

In some examples, an electronic display 250 is positioned within each cavity of the plurality of housing compartments 202. That is, the frame assembly 200 may include a plurality of electronic displays 250, where the light sources 162 and/or light sensors 164 associated with each housing compartment 202 cooperate to emit light based on a respective electronic display 250. Alternatively, the light sources 162 and/or light sensors 164 may cooperate with each other to emit light based on any combination of electronic displays 250, including a single, common electronic display 250. For example, the light sensors 164 associated with a first electronic display 250 may communicate with the light sources 162 associated with one or more other electronic displays 250 to frame, stage, and/or present the other electronic displays 250 based on the light emitted from the electronic display 250 and/or the ambient light detected around the first electronic display 250. Moreover, in some examples, any quantity of electronic displays 250 may be positioned in the cavities of any combination of the housing compartments 202, including a single electronic display 250 being positioned in the cavity of a single housing compartment 202.

The housing compartments 202 are hingedly coupled to each other such that one or more housing compartments 202 are rotatable about an axis of rotation 258. The housing compartments 202 may include, for example, a first housing compartment 260 and a second housing compartment 262 coupled to the first housing compartment 260 using one or more hinge mechanisms 264 (shown in FIG. 5) at the axis of rotation 258. In some examples, the hinge mechanisms 264 are coupled to a rear surface 266 (shown in FIG. 5) of a rear panel 210 included in the first housing compartment 260 (a "first" rear surface) and to a rear surface 268 (shown in FIG. 5) of a rear panel 210 included in the second housing compartment 262 (a "second" rear surface). A hinge mechanism 264 may be or include one elongated hinge having a length 270 (shown in FIG. 5) of at least 18.0 inches (45.72 centimeters (cm)) and a width 272 (shown in FIG. 5) of approximately 2.0 in. (5.08 cm) when folded. Alternatively, the hinge mechanism 264 may have any size, shape, and/or configuration and/or be coupled to any combination of surfaces that enable the frame assembly 200 to function as described herein.

The first housing compartment 260 and/or second housing compartment 262 are selectively rotatable about the axis of rotation 258 to face the same direction or different directions. In some examples, the axis of rotation 258 extends generally in a vertical direction (e.g., along the Y-axis 274) such that the first housing compartment 260 and/or second housing compartment 262 are rotatable to face one or more directions in a horizontal plane perpendicular to the vertical direction (e.g., a plane defined by the X-axis 276 and the Z-axis 278). For example, when the first housing compartment 260 is oriented to face a first or frontward direction 280 (e.g., in a positive direction along the Z-axis 278), as shown in FIGS. 3-5, the second housing compartment 262 is selectively rotatable about the axis of rotation 258 to face one of a plurality of directions, including the frontward direction 280, as shown in FIGS. 4 and 5, and a second or rearward direction 282 opposite the frontward direction 280 (e.g., in a negative direction along the Z-axis 278), as shown in FIG. 3.

The housing compartments 202 include a plurality of mounting mechanisms 290 (e.g., mounting mechanisms 190). The mounting mechanisms 190 may be spaced approximately 8.0, 16.0, or 24.0 in. (20.32, 40.64, or 60.96 cm, respectively) apart from each other for alignment with standardly-spaced vertical wall studs. In some examples, the mounting mechanism 190 extends leftward from a left sidewall, rightward from a right sidewall, upward from an upper sidewall, and/or downward from a lower sidewall. Alternatively, the mounting mechanism 190 may be in any position and/or orientation that enable the housing compartment 202 to be hung or suspended.

FIGS. 6 and 7 show an example stand 300 that may be used with a frame (e.g., frame subassembly 100, frame assembly 200). FIG. 6 is a front view of the stand 300; and FIG. 7 is an exploded view of the stand 300.

The stand 300 includes a base 310 and a ladder 320 coupled to and extending upwardly from the base 310. The base 310 is sized, shaped, and/or configured to keep the stand 300 in an upright position. In some examples, the base 310 enables a frame system, including the stand 300 and a frame coupled to the stand 300, to maintain equilibrium or a resting position in which the stand 300 is in the upright position, and resist tipping over when titled up to at least 15° from the resting position.

The ladder 320 includes a plurality of masts 330 (e.g., mast 180), and the base 310 includes a plurality of receivers 340 defining a plurality of ports 342 (shown in FIG. 7) sized, shaped, and/or configured to receive the masts 330 therein. The ports 342 have a depth 344 that enables the receivers 340 to provide horizontal or lateral support to the masts 330 when a lower end portion 346 (shown in FIG. 7) of each mast 330 is positioned in a respective port 342. The masts 330 may have a height 348, for example, of approximately 40.0 in. (101.6 cm). In some examples, the ladder 320 includes one or more rungs 350 extending between the masts 330 to provide horizontal or lateral support to the masts 330. Alternatively, the ladder 320 may have any size, shape, and/or configuration that enables the stand 300 to function as described herein.

In some examples, the stand 300 includes a cover 360 (shown in FIG. 7) extending over the base 310. The cover 360 may include a plurality of openings 362 (shown in FIG. 7) defined therein that are sized, shaped, and/or configured to allow the receivers 340 to extend therethrough. In some examples, the cover 360 is coupled to the base 310 using a snap-fit connection or an interference-fit connection. The snap-fit or interference-fit connection may be selectively releasable or fixed. In this manner, the cover 360 may be releasably or fixedly attached to the base 310. Alternatively, the base 310 and cover 360 may be formed as a single piece.

Figure 8:
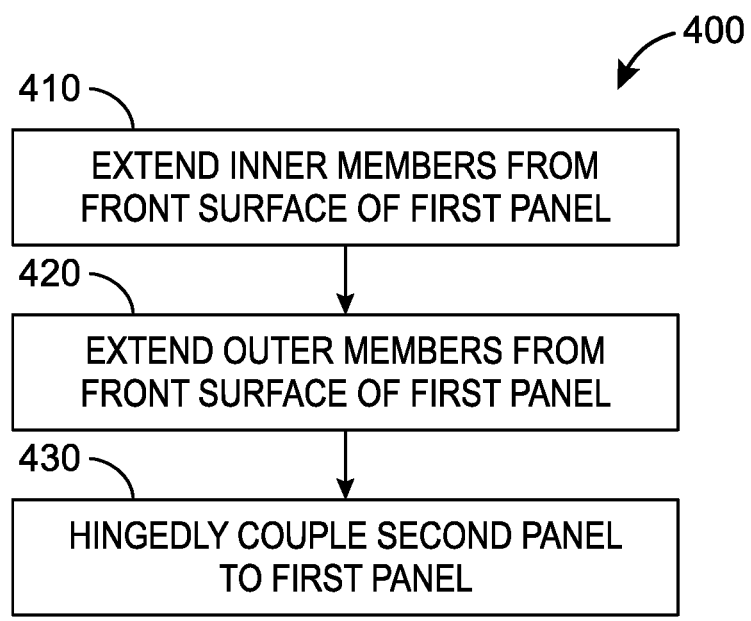
FIG. 8 is a flowchart of an example method that may be used to provide a frame assembly, such as the frame assembly shown in FIG. 3.

FIG. 8 is a flowchart of an example method 400 that may be used to provide a frame assembly (e.g., frame assembly 200) in which a plurality of housing compartments (e.g., frame subassembly 100, housing compartment 202, first housing compartment 260, second housing compartment 262) are coupled together to enable a user to selectively position and/or orient one or more monitors or presentation devices (e.g., electronic display 160, electronic display 250).

The method 400 includes extending at operation 410 a plurality of inner members 120 (e.g., an inner left sidewall and an inner right sidewall) from a front surface 152 of a first panel (e.g., a first rear panel 110), and extending at operation 420 a plurality of outer members 130 (e.g., an outer left sidewall and an outer right sidewall) from the front surface 152 of the first panel. The inner members 120 and outer members 130 may be extended from the front surface 152 towards a first direction (e.g., frontward direction 280), for example, and spaced from each other to define a plurality of channels 170 (e.g., channel 240) between the inner members 120 and their corresponding outer members 130. Each channel 170 is sized, shaped, and/or configured to receive a mast 180 (e.g., mast 330) therein.

A second panel (e.g., a second rear panel 110) is hingedly coupled at operation 430 to the first panel such that the first panel and/or second panel are rotatable about an axis of rotation (e.g., axis of rotation 258). The first panel and second panel may each be positioned behind a respective presentation device. In some examples, the presentation devices are positionable in cavities 150 defined at least in part by the first panel, second panel, and/or inner members 120.

A plurality of moldings (e.g., front panel 140, molding 220) are positionable in front of the presentation devices such that the moldings frame the presentation devices. In some examples, one or more light sources 162 and/or light sensors 164 are positionable between the first panel and a corresponding molding and/or between the second panel and a corresponding molding. The light sources 162 may be positioned at one or more locations about the presentation devices, for example, and the moldings may be positioned such that one or more translucent areas of the moldings (e.g., translucent areas 256) are adjacent or proximate to the light sources 162. In this manner, the translucent areas may be positioned and/or oriented to allow at least some light emitted from the light sources 162 to pass therethrough. The light sensors 164 may be positioned to identify ambient light, light emitted from the light sources 162, and/or light emitted from the presentation device.

During use, the frame assembly is mountable on or coupleable to a stand (e.g., stand 300). The channels 170 may be aligned with a plurality of masts 180 for receiving the masts 180 therein. The masts 180 may be received, for example, from the rear (e.g., the front surface 152 is oriented to face away from the masts 180) and/or below (e.g., the first panel is moved downward relative to the masts 180). Alternatively, the masts 180 may be received from the front (e.g., the front surface 152 is oriented to face the masts 180) and/or below (e.g., the first panel is moved downward relative to the masts 180).

When the masts 180 are positioned in the channels 170, a first housing compartment (e.g., the housing compartment including the first panel, inner members 120, and outer members 130) is stationary relative to the stand. The first panel, inner members 120, and/or outer members 130, for example, at least partially restrict movement of the first housing compartment relative to the masts 180. In some examples, rear surfaces of the masts 180 engage the front surface 152 of the first panel, inner surfaces of the masts 180 engage outer surfaces of the inner members 120, and/or outer surfaces of the masts 180 engage inner surfaces of the outer members 130. Additionally, one or more upper members extending between the inner members 120 and outer members 130 may at least partially restrict downward movement of the frame assembly relative to the masts 180. For example, upper surfaces of the masts 180 may engage lower surfaces of the upper members. In some examples, one or more coupling mechanisms 186 are used to facilitate securing the masts 180 in the channels 170.

When the frame assembly is coupled to the stand, a second housing compartment (e.g., the housing compartment including the second panel) may be moveable relative to the stand and/or first housing compartment between a closed position and an open position. For example, if the first housing compartment is oriented to face the first direction, as shown in FIGS. 3-5, the second housing compartment faces a second, opposite direction (e.g., rearward direction 282) when in the closed position, as shown in FIG. 3, and a direction other than the second direction when in the open position, including the first direction, as shown in FIGS. 4 and 5.

Figure 9:
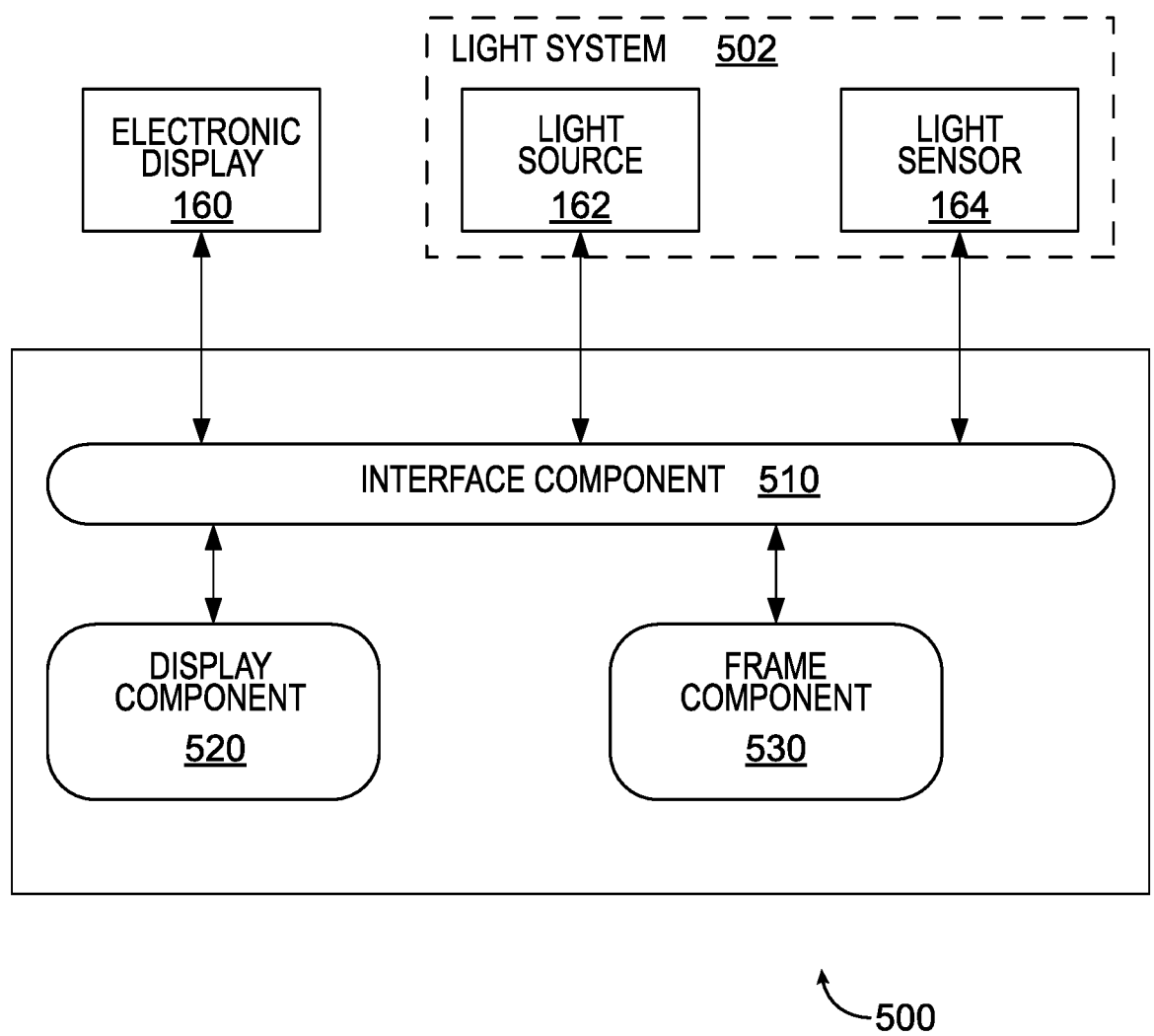
FIG. 9 is a block diagram of an example content management system that may be used with a frame assembly, such as the frame assembly shown in FIG. 3.

FIG. 9 is a block diagram of an example content management system 500 that may be used with a frame (e.g., frame subassembly 100, frame assembly 200). The content management system 500 may be configured, for example, to manage or control one or more electronic displays 160 (e.g., electronic display 250) and/or a lighting system 502, including one or more light sources 162 and light sensors 164. The content management system 500 includes an interface component 510, a display component 520, and a frame component 530.

The interface component 510 facilitates communication between and among software components, computer hardware, peripheral devices, and/or users. The interface component 510 may allow, for example, the display component 520 and frame component 530 to exchange information with each other. In some examples, the interface component 510 enables the electronic display 160 and/or lighting system 502 to receive data from and/or present data to a user. The interface component 510 may communicate, for example, with a user interface that allows the user to enter one or more commands and/or provide information (e.g., user input) to the electronic display 160 and/or lighting system 502. In this manner, the interface component 510 may facilitate communication between the user and the electronic display 160, lighting system 502, display component 520, and/or frame component 530.

The display component 520 controls one or more operations associated with the electronic displays 160. The display component 520 may obtain (e.g., via the interface component 510) user input and generate one or more instructions for transmission (e.g., via the interface component 510) to the electronic displays 160. The instructions may enable the electronic displays 160 to present information or content to one or more observers or passersby, for example.

The frame component 530 controls one or more operations associated with the lighting system 502. A light sensor 164, for example, may detect light and transmit (e.g., via the interface component 510) data associated with the detected light to the frame component 530. The frame component 530 may analyze the data to identify one or more colors associated with the detected light. In some examples, the frame component 530 determines whether the detected light is associated with the electronic display 160 and/or light sources 162. Additionally or alternatively, the frame component 530 may communicate with the electronic display 160 and/or light sources 162 (e.g., via the interface component 510) to identify content and/or colors presented or emitted by the electronic display 160 and/or light sources 162.

The frame component 530 identifies or selects one or more light sources 162 and communicates with the selected light sources 162 (e.g., via the interface component 510) to manage or control light emitted from the light sources 162. Light may be selectively emitted, for example, such that light emitted through the translucent areas 256 (e.g., light visible to observers or passersby) complements the content and/or colors presented by the electronic display 160.

The frame component 530 may identify or select one or more colors, patterns, and/or intensities for emission from the light sources 162, for example, and generate one or more instructions for transmission (e.g., via the interface component 510) to the light sources 162. Colors, patterns, and/or intensities may be selected, for example, to match or complement the colors detected by the light sensors 164 and/or emitted by the electronic display 160 and/or other light sources 162. In this manner, the light sources 162 may be configured to emit light reactively (e.g., based on light detected by the light sensors 164) and/or proactively (e.g., based on instructions generated for transmission to the electronic display 160 and/or light sources 162).

Figure 10:
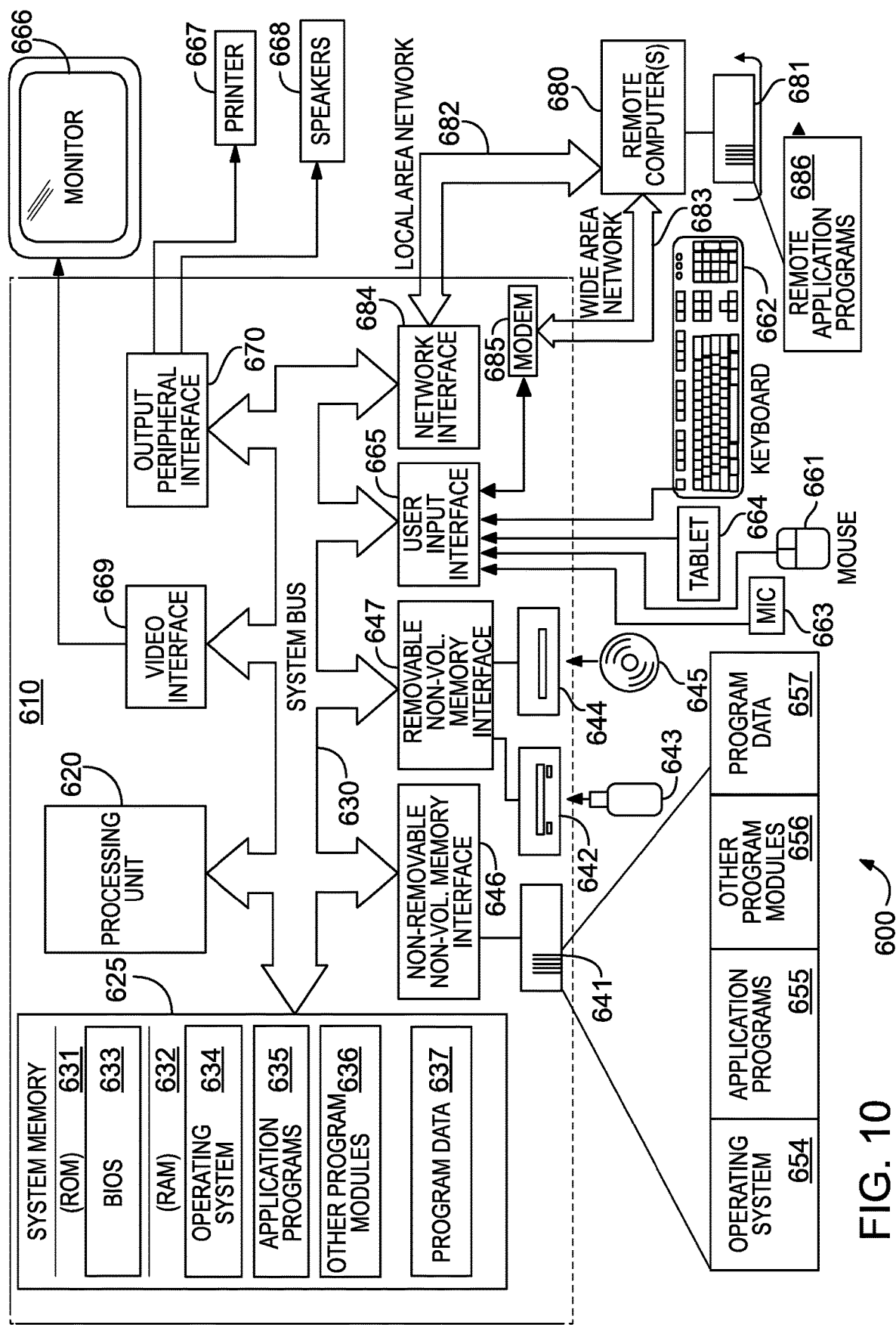
FIG. 10 is a block diagram illustrating an example operating environment in which computing operations may be performed.

FIG. 10 is a block diagram illustrating an example operating environment 600 that enables a computing system (e.g., content management system 500) to perform one or more operations. The operating environment 600 is only one example of a computing and networking environment and is not intended to suggest any limitation as to the scope of use or functionality of the disclosure. The operating environment 600 should not be interpreted as having any dependency or requirement relating to any one or combination of components illustrated in the example operating environment 600.

The disclosure is operational with numerous other computing and networking environments or configurations. While some examples of the disclosure are illustrated and described herein with reference to the operating environment 600 being or including a content management system 500 (shown in FIG. 9), aspects of the disclosure are operable with any computing system that executes instructions to implement the operations and functionality associated with the operating environment 600.

For example, the operating environment 600 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 600 may represent a group of processing units or other computing systems. Additionally, any computing system described herein may be configured to perform any operation described herein including one or more operations described herein as being performed by another computing system.

With reference to FIG. 10, an example system for implementing various aspects of the disclosure may include a general purpose computing system in the form of a computer 610. Components of the computer 610 may include, but are not limited to, a processing unit 620 (e.g., a processor), a system memory 625 (e.g., a computer-readable storage device), and a system bus 630 that couples various system components including the system memory 625 to the processing unit 620. The system bus 630 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 625 includes any quantity of media associated with or accessible by the processing unit 620. For example, the system memory 625 may include computer storage media in the form of volatile and/or nonvolatile memory, such as read only memory (ROM) 631 and random access memory (RAM) 632. The ROM 631 may store a basic input/output system (BIOS) 633 that facilitates transferring information between elements within computer 610, such as during start-up. The RAM 632 may contain data and/or program modules that are immediately accessible to and/or presently being operated on by processing unit 620. For example, the system memory 625 may store computer-executable instructions, application data, profile data, usage data, location data, color data, content, and other data. By way of example, and not limitation, FIG. 10 illustrates operating system 634, application programs 635, other program modules 636, and program data 637.

The computer 610 includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 631, RAM 632, electrically erasable programmable read-only memory (EEPROM), solid-state memory, flash memory, a hard disk, magnetic storage, floppy disk, magnetic tape, a compact disc (CD), a digital versatile disc (DVD), a Blu-ray Disc® brand optical disc, an ultra density optical (UDO) disc, or any other medium which may be used to store the desired information and which may be accessed by the computer 610. (Blu-ray Disc® is a registered trademark of Blu-ray Disc Association). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media.

By way of example only, FIG. 10 illustrates a hard disk drive 641 that reads from or writes to non-removable, nonvolatile magnetic media, a universal serial bus (USB) port 642 that reads from or writes to a removable, nonvolatile memory 643, and an optical disk drive 644 that reads from or writes to a removable, nonvolatile optical disk 645. Other removable/non-removable, volatile/nonvolatile computer storage media that may be used in the example operating environment include, but are not limited to, solid state memory, flash memory, and the like. The hard disk drive 641 may be connected to the system bus 630 through a non-removable memory interface such as interface 646, and USB port 642 and optical disk drive 644 may be connected to the system bus 630 by a removable memory interface, such as interface 647.

The drives and their associated computer storage media, described above and illustrated in FIG. 10, provide storage of computer-executable instructions, data structures, program modules, components (e.g., interface component 510, display component 520, frame component 530), applications, and other data for the computer 610. In FIG. 10, for example, hard disk drive 641 is illustrated as storing operating system 654, application programs 655, other program modules 656 and program data 657. Note that these components may either be the same as or different from operating system 634, application programs 635, other program modules 636, and program data 637. Operating system 654, application programs 655, other program modules 656, and program data 657 are given different numbers herein to illustrate that, at a minimum, they are different copies.

The processing unit 620 includes any quantity of processing units, and the instructions may be performed by the processing unit 620 or by multiple processors within the operating environment 600 or performed by a processor external to the operating environment 600. The processing unit 620 may be programmed to execute the computer-executable instructions for implementing aspects of the disclosure. For example, the processing unit 620 may execute an interface component 510 (shown in FIG. 9), a display component 520 (shown in FIG. 9), and/or a frame component 530 (shown in FIG. 9) for implementing aspects of the disclosure.

Upon programming or execution of these components, the operating environment 600 and/or processing unit 620 is transformed into a special purpose microprocessor or machine. For example, the display component 520, when executed by the processing unit 620, causes the computer 610 to control one or more operations associated with the electronic displays 160; and the frame component 530, when executed by the processing unit 620, causes the computer 610 to control one or more operations associated with the lighting system 502. Although the processing unit 620 is shown separate from the system memory 625, examples of the disclosure contemplate that the system memory 625 may be onboard the processing unit 620 such as in some embedded systems.

A user may enter commands and information into the computer 610 through one or more input devices, such as a pointing device 661 (e.g., mouse, trackball, touch pad), a keyboard 662, a microphone 663, and/or an electronic digitizer 664 (e.g., on a touchscreen). Other input devices not shown in FIG. 10 may include a joystick, a game pad, a controller, a camera, a scanner, an accelerometer, a satellite dish, or the like. The computer 610 may accept input from the user in any way, including from input devices, via gesture input, via proximity input (such as by hovering), and/or via voice input. These and other input devices may be coupled to the processing unit 620 through a user input interface 665 that is coupled to the system bus 630, but may be connected by other interface and bus structures, such as a parallel port, game port or the USB port 642.

Information, such as text, images, audio, video, graphics, alerts, and the like, may be presented to a user via one or more presentation devices, such as a monitor 666, a printer 667, and/or a speaker 668. Other presentation devices not shown in FIG. 10 may include a projector, a vibrating component, or the like. These and other presentation devices may be coupled to the processing unit 620 through a video interface 669 (e.g., for a monitor 666 or a projector) and/or an output peripheral interface 670 (e.g., for a printer 667, a speaker 668, and/or a vibration component) that are coupled to the system bus 630, but may be connected by other interface and bus structures, such as a parallel port, game port or the USB port 642. In some examples, the presentation device is integrated with an input device configured to receive input from the user (e.g., a capacitive touchscreen panel, a controller including a vibrating component). Note that the monitor 666 and/or touch screen panel may be physically coupled to a housing in which the computer 610 is incorporated, such as in a tablet-type personal computer.

The computer 610 may operate in a networked environment using logical connections to one or more remote computers, such as a remote computer 680. The remote computer 680 may be a personal computer (PC), a server, a router, a network PC, a peer device or other common network node, and typically includes many or all of the elements described above relative to the computer 610, although only a memory storage device 681 has been illustrated in FIG. 10. The logical connections depicted in FIG. 10 include one or more local area networks (LANs) 682 and one or more wide area networks (WANs) 683, but may also include other networks. Such networking environments are commonplace in offices, enterprise-wide computer networks, intranets and the Internet.

When used in a LAN networking environment, the computer 610 is coupled to the LAN 682 through a network interface or adapter 684. When used in a WAN networking environment, the computer 610 may include a modem 685 or other means for establishing communications over the WAN 683, such as the Internet. The modem 685, which may be internal or external, may be connected to the system bus 630 via the user input interface 665 or other appropriate mechanism. A wireless networking component including an interface and antenna may be coupled through a device, such as an access point or peer computer to a LAN 682 or WAN 683. In a networked environment, program modules depicted relative to the computer 610, or portions thereof, may be stored in the remote memory storage device. By way of example, and not limitation, FIG. 10 illustrates remote application programs 686 as residing on memory storage device 681. It may be appreciated that the network connections shown are examples and other means of establishing a communications link between the computers may be used.

The block diagram of FIG. 10 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 10 may be performed by other elements in FIG. 10, or an entity (e.g., processor, web service, applications, server, computing system, etc.) not shown in FIG. 10.

Example frame assemblies are described herein and illustrated in the accompanying drawings. The frame assemblies described herein provide an enhanced visual appearance compared to conventional electronic displays. For example, the examples described herein enable electronic displays to be presented in an upright position in an adjustable and aesthetically-pleasing manner. The electronic displays may be rotated, for example, to facilitate increasing exposure and/or attracting more eyeballs. The electronic displays may also be framed by light that complements content displayed on the electronic display. This written description uses examples to disclose aspects of the disclosure and also to enable a person skilled in the art to practice the aspects, including making or using the above-described devices, assemblies, and/or systems and executing or performing the above-described operations.

Although described in connection with an example computing system environment, examples of the disclosure are capable of implementation with numerous other general purpose or special purpose computing system environments, configurations, or devices. Examples of well-known computing systems, environments, and/or configurations that may be suitable for use with aspects of the disclosure include, but are not limited to, mobile devices, tablets, laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In some examples, the operations described herein may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various examples with their associated operations, a person skilled in the art would appreciate that a combination of operations from any number of different examples is also within the scope of the aspects of the disclosure.

What is claimed is:

1. A frame assembly comprising:
   a first panel having a first front surface and a first rear surface, the first panel oriented such that the first front surface faces a first direction and the first rear surface faces a second direction opposite the first direction;
   a plurality of inner members coupled to the first front surface, the plurality of inner members extending from the first front surface towards the first direction;
   a plurality of outer members coupled to the first front surface, wherein a plurality of openings are defined in the plurality of outer members, the plurality of outer members extending from the first front surface towards the first direction and spaced from the plurality of inner members to define a plurality of channels therebetween;
   a plurality of coupling mechanisms extending through the plurality of openings defined in the plurality of outer members; and
   a second panel having a second front surface and a second rear surface, the second panel hingedly coupled to the first panel such that one or more of the first panel or the second panel are rotatable about an axis of rotation.

2. The frame assembly of claim 1, further comprising one or more hinge mechanisms at the axis of rotation, the one or more hinge mechanisms coupled to one or more of the first rear surface or the second rear surface.

3. The frame assembly of claim 1, further comprising:
   a plurality of moldings comprising a plurality of translucent areas; and
   a plurality of light sources configured to emit at least some light through the plurality of translucent areas, the plurality of light sources including a first light source and a second light source, the first light source positionable between the first panel and a first molding of the plurality of moldings, the second light source positionable between the second panel and a second molding of the plurality of moldings.

4. The frame assembly of claim 3 further comprising a content management system including a plurality of light sensors, the content management system configured to control the plurality of light sources.

5. The frame assembly of claim 1, wherein the second panel is rotatable about the axis of rotation between a first position and a second position, the second front surface oriented to face the first direction and the second rear surface oriented to face the second direction when the second panel is in the first position, the second front surface oriented to face the second direction and the second rear surface oriented to face the first direction when the second panel is in the second position.

6. The frame assembly of claim 1, wherein the plurality of outer members are generally parallel with the plurality of inner members.

7. The frame assembly of claim 1, further comprising a plurality of coupling mechanisms extending in the plurality of channels between the plurality of inner members and the plurality of outer members.

8. The frame assembly of claim 1, further comprising an upper member coupled to the first front surface, the upper member extending from the first front surface towards the first direction.

9. The frame assembly of claim 8 further comprising one or more mounting mechanisms extending upward from the upper member.

10. The frame assembly of claim 1 further comprising one or more mounting mechanisms extending outward from a first outer member of the plurality of outer members.

11. The frame assembly of claim 1 further comprising:
    a plurality of sidewalls including a first sidewall; and
    one or more mounting mechanisms extending outward from the first sidewall of the plurality of sidewalls.

12. The frame assembly of claim 1 further comprising an upper sidewall coupled to the second front surface.

13. The frame assembly of claim 12 further comprising one or more mounting mechanisms extending upward from the upper sidewall.

14. The frame assembly of claim 1 further comprising a plurality of sidewalls coupled to the second front surface.

15. A method of assembling a frame assembly, the method comprising:
- coupling a plurality of inner members to a front surface of a first panel such that the plurality of inner members extend from the front surface towards a first direction, the front surface facing the first direction;
- coupling a plurality of outer members to the front surface such that the plurality of outer members extend from the front surface towards the first direction, the plurality of outer members spaced from the plurality of inner members to define a plurality of channels therebetween;
- extending a plurality of coupling mechanisms in the plurality of channels between the plurality of inner members and the plurality of outer members; and
- hingedly coupling a second panel to the first panel such that one or more of the first panel or the second panel are rotatable about an axis of rotation.

16. The method of claim 15 further comprising:
- positioning a first light source between the first panel and a first molding; and
- positioning a second light source between the second panel and a second molding.

17. The method of claim 15 further comprising extending a plurality of coupling mechanisms through a plurality of openings defined in the plurality of outer members.

18. The method of claim 15 further comprising extending one or more mounting mechanisms outward from a first outer member of the plurality of outer members.

19. A method of assembling a frame assembly, the method comprising:
- coupling a plurality of inner members to a front surface of a first panel such that the plurality of inner members extend from the front surface towards a first direction, the front surface facing the first direction;
- coupling a plurality of outer members to the front surface such that the plurality of outer members extend from the front surface towards the first direction, wherein a plurality of openings are defined in the plurality of outer members, the plurality of outer members spaced from the plurality of inner members to define a plurality of channels therebetween;
- extending a plurality of coupling mechanisms through the plurality of openings defined in the plurality of outer members; and
- hingedly coupling a second panel to the first panel such that one or more of the first panel or the second panel are rotatable about an axis of rotation.

* * * * *